(No Model.)
J. ZIMMERMAN.
MEAT MIXER.
No. 251,015.  Patented Dec. 13, 1881.
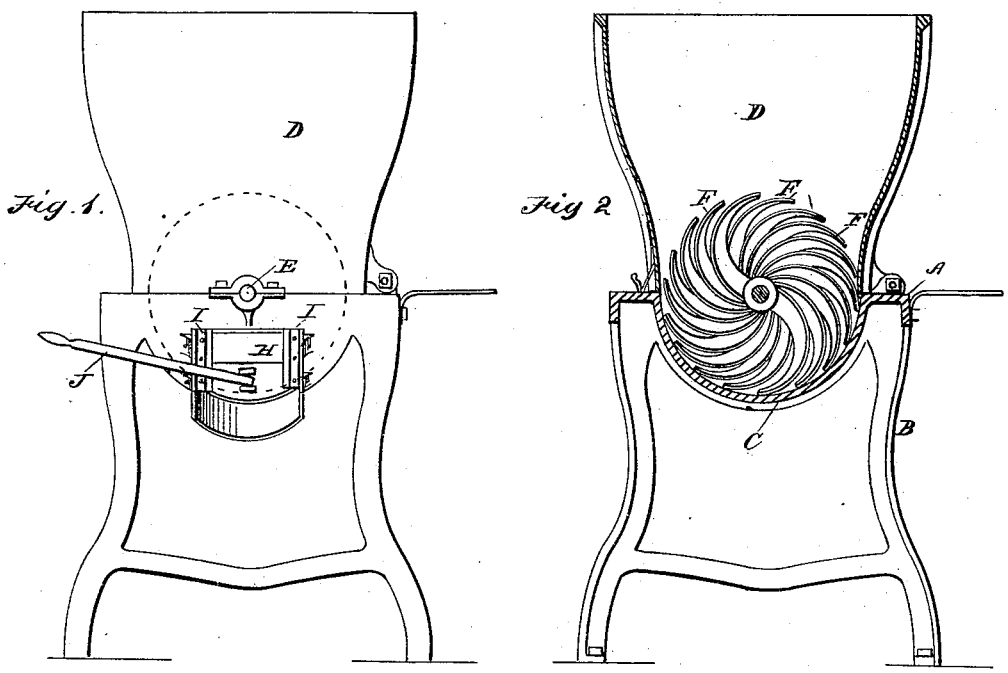
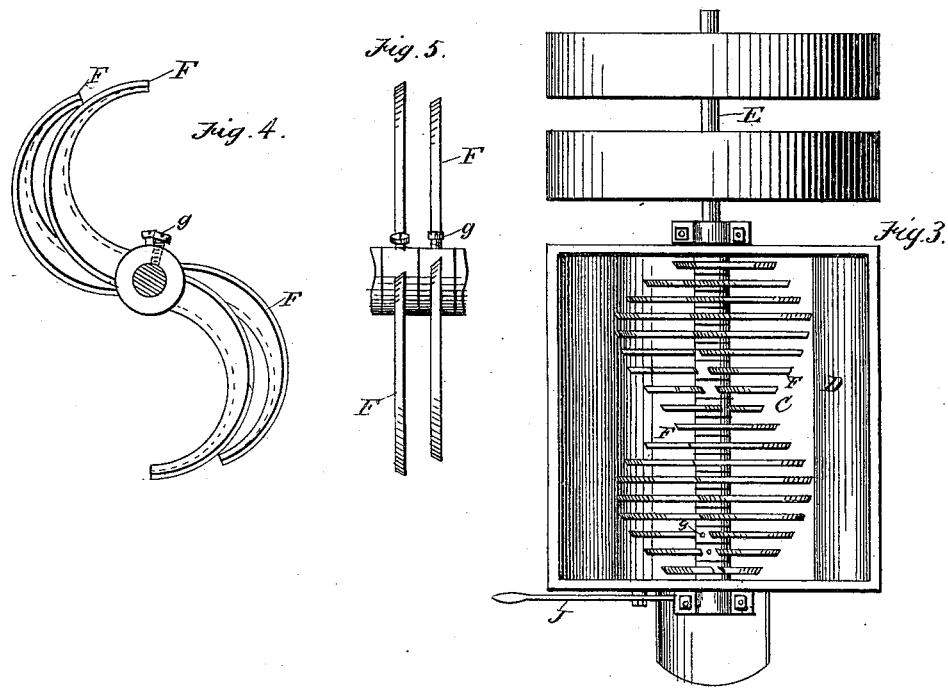
Attest,
W. H. H. Knight
W. Blackstock
Inventor:
John Zimmerman
By E. T. Ellsworth
His Attorney.

UNITED STATES PATENT OFFICE.

JOHN ZIMMERMAN, OF CINCINNATI, OHIO.

MEAT-MIXER.

SPECIFICATION forming part of Letters Patent No. 251,015, dated December 13, 1881.

Application filed December 11, 1880. (No model.)

*To all whom it may concern:*

Be it known that I, JOHN ZIMMERMAN, of Cincinnati, in the county of Hamilton and State of Ohio, have invented a certain new and Improved Meat-Mixer; and I do hereby declare the following to be a full, clear, and exact description of the same, reference being had to the accompanying drawings, forming part of this specification, in which—

Figure 1 is an end view of my improved meat-mixer, looking toward the discharge end. Fig. 2 is a transverse section of the same. Fig. 3 is a top-plan view with the hopper removed. Fig. 4 is an elevation of two of the mixing-arms; and Fig. 5 is an edge view of the same.

Similar letters of reference in the several figures denote the same parts.

In order to produce sausages of the best quality it is necessary that the minced meat of which they are composed shall be made light and spongy, in contradistinction to heavy and inelastic, for the same reason that the best quality of bread should be light and spongy, instead of forming a compact and sodden mass. It is also necessary that the minced meat shall be so mixed that the different kinds or qualities shall be thoroughly incorporated and the seasoning uniformly distributed. To produce these results one of the most important requisites is to conduct the mixing process as rapidly as possible. It is often necessary, also, with certain qualities of meat, to use a quantity of water, which must be quickly and thoroughly mixed with the meat, or otherwise it would flow off without producing the desired effect.

My invention has for its object to attain these advantageous results by such a construction and combination of mechanism as shall quickly and thoroughly mix the meat, uniformly distribute the seasoning and water, (if the latter is used,) and complete the operation at a time when the meat is the lightest and most elastic.

The meat-mixers in general use by sausage-manufacturers are constructed to operate simply as stirrers to pass through the mass of meat lying in a receptacle, the effect of which is to displace only such parts as lie within the path of the stirrers without changing the position of the whole mass.

The principle of feeding the whole mass of meat through the receptacle while being acted upon by the stirrers, and thereby subjecting it all to their action, so as to produce a complete and uniform mixture, has never, prior to my invention, been embodied in this class of machinery.

One principle of my invention therefore consists in moving the whole mass of meat parallel with the mixer-shaft, and thereby subjecting all parts of it to the action of the stirrers or mixing-arms.

Another feature of my invention consists in automatically passing and repassing the meat across the path of the stirrers when necessary to complete the mixing.

Another feature of the invention consists in automatically discharging the mixed meat from the machine when it has reached the proper condition of lightness and sponginess.

In carrying out my invention I construct a cast-iron frame, A, of rectangular or other proper form, supported on suitable legs, B, and of the requisite dimensions. Within this frame I suspend a half-cylinder, C, which may be either attached to or cast with the frame. This half-cylinder constitutes the trough or receptacle within which the meat is mixed.

D is the hopper, hinged at one side to the top of the frame A, so as to be swung off or on the cylinder. The object of thus attaching the hopper is to admit of its being swung off the mixing-receptacle for access to the interior thereof and to the stirrers for any desired purpose, such as cleaning or repairing the stirrers. The hopper is made of large capacity to receive a considerable quantity of minced meat, which is fed by gravity directly down upon the stirrers.

E is the stirrer-shaft, having its bearings in the ends of the semi-cylinder, and adapted to be driven from an engine in any of the well-known ways.

F are the stirrers, constructed in the form of reverse-curved arms, or made S-shaped, and slipped centrally upon the shaft, so that in the rotation of the latter their convex edges shall act successively on the meat contained in the receptacle C. Each arm is constructed with a central hub, through which the shaft passes, such hubs serving to space the arms, and also to receive screws $g$, by which the arms are locked to the shaft. The arms project from opposite sides of the shaft sufficiently far to move in close proximity with the inner circumference of the trough, the object of this provision being to prevent the meat from being thrown by the centrifugal force of the arms beyond the ends of the latter, and thereby leaving a body of meat between such ends and the receptacle which could not receive their action, and would therefore be incompletely mixed. By this extension of the stirrers their ends reach the outer edges of the mass of meat, and therefore act upon it without leaving any part untouched. The convex edges of each arm are beveled in opposite directions, so that in passing through the meat they shall displace it on one side more than on the other, and inasmuch as the arms are adjusted on the shaft so as to form a spiral arrangement around it, they operate not only to pass through and displace the meat, but also to feed the whole mass lengthwise through the receptacle to the discharge end, and expel it through a gateway made for the purpose. If, in the operation of the machine, the meat should not be sufficiently mixed and lightened by one passage through the receptacle, then the stirrers pass or feed it back above the shaft to the opposite end of the trough, and again feed it forward under the shaft to the discharge end. In its passage above the stirrer-shaft it is not acted upon by the stirrers as effectually as in its passage beneath the shaft. The movement of the meat along the trough, combined with the transverse action of the stirrers, keeps the whole mass constantly agitated from end to end and side to side, and therefore mixes and lightens it at the same time, and when it has become thoroughly mixed and lightened the gateway is opened and the meat fed by the stirrers out of the receptacle. The gateway is closed by a gate, H, sliding in guides I I on the outside of the receptacle, and the gate is operated by a hand-lever, J, suitably arranged, as shown in Fig. 1. The gateway is placed below the line of the stirrer-shaft to prevent the discharge of the unmixed meat from the hopper, and it also serves to draw off water from the receptacle, and to permit access to the interior thereof for cleaning and other purposes.

Having thus described my invention, what I claim as new, and desire to secure by Letters Patent, is—

1. A meat-mixer composed essentially of a semi-cylindrical mixing-trough having an unobstructed interior surface, and provided with an end discharge opening or gate, a series of spirally-arranged S-shaped mixing arms or stirrers having their convex edges beveled on one side and adapted to rotate within the trough, with their ends in close proximity to its walls, and a feed-hopper placed over the trough and stirrers, substantially as described, for the purpose specified.

2. In a meat-mixer, a series of S-shaped mixing arms or stirrers arranged spirally upon a shaft, and having their convex edges beveled on one side, combined with a mixing-trough having an unobstructed interior surface to feed the minced meat lengthwise thereof, and at the same time act upon it transversely of the trough from the center to the walls, substantially as described, for the purpose specified.

3. The combination, with the semi-cylindrical mixing-trough having an unobstructed interior surface, and the spirally-arranged S-shaped stirrers, beveled on their convex edges, of a gate at the end of the trough, which is opened to permit the stirrers to discharge the mixed meat from the machine, and kept closed to permit the stirrers to feed the meat back and forth in the trough above and below the stirrer-shaft, substantially as described, for the purpose specified.

JOHN ZIMMERMAN.

Witnesses:
F. H. KNIGHT,
W. BLACKSTOCK.